(12) United States Patent
Yun (10) Patent No.: US 11,673,610 B2
(45) Date of Patent: Jun. 13, 2023

(54) DOOR HINGE MOUNT OF SIDE OUTER PANEL FOR VEHICLE

(71) Applicants: HYUNDAI MOTOR COMPANY, Seoul (KR); KIA CORPORATION, Seoul (KR)

(72) Inventor: Hyun Cheol Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 141 days.

(21) Appl. No.: 17/480,716

(22) Filed: Sep. 21, 2021

(65) Prior Publication Data
US 2022/0220784 A1     Jul. 14, 2022

(30) Foreign Application Priority Data
Jan. 12, 2021   (KR) .......................... 10-2021-0003824

(51) Int. Cl.
| | | |
|---|---|---|
| B62D 25/04 | (2006.01) | |
| B60J 5/04 | (2006.01) | |
| E05D 5/02 | (2006.01) | |
| E05D 9/00 | (2006.01) | |
| E05D 7/12 | (2006.01) | |

(52) U.S. Cl.
CPC ............ *B62D 25/04* (2013.01); *B60J 5/0468* (2013.01); *E05D 5/0207* (2013.01); *E05D 7/121* (2013.01); *E05D 9/005* (2013.01); *B60J 5/0472* (2013.01)

(58) Field of Classification Search
CPC .......... B62D 25/04; B62D 29/005; B60J 5/04; B60J 5/047; B60J 5/0431; B60J 5/0468; B60J 5/0469; E05Y 2900/531
USPC .......................... 296/193.06, 146.11, 146.12
See application file for complete search history.

(56) References Cited

U.S. PATENT DOCUMENTS 9,126,247 B2 *   9/2015   Kim ...................... B62D 21/157
10,351,177 B2 *   7/2019   Steffens ............... B62D 21/157

FOREIGN PATENT DOCUMENTS

EP              3950467 B1 *   8/2022   ............. B62D 25/04

\* cited by examiner

*Primary Examiner* — Dennis H Redder
(74) *Attorney, Agent, or Firm* — Morgan, Lewis & Bockius LLP (57) ABSTRACT

A door hinge mount of a side external panel for a vehicle, may provide the door hinge mount, capable of being formed of a material, requiring low initial investment expenses, and securing the same level of rigidity as in the case where a steel material is used.

15 Claims, 4 Drawing Sheets

DOOR HINGE MOUNT OF SIDE OUTER PANEL FOR VEHICLE

CROSS-REFERENCE TO RELATED APPLICATION

The present application claims priority to Korean Patent Application No. 10-2021-0003824 filed on Jan. 12, 2021, the entire contents of which is incorporated herein for all purposes by this reference.

BACKGROUND OF THE INVENTION

Field of the Invention

The present invention relates to a door hinge mount of a side outer panel for a vehicle. Particularly, it relates to a door hinge mount of a side outer panel which may structurally secure rigidity and prevent damage.

Description of Related Art

Due to recent various demands of customers, a variety of vehicles are produced in a small amount. Thus, it becomes gradually difficult to apply a side external panel, which is made of a steel material and requires excessive initial die investment expenses, to a vehicle body.

Therefore, as an alternative to the side external panel of a steel material, researches on a side external panel, which is made of a composite material and requires relatively low initial die investment expenses, are under way.

The side external panel made of a composite material, however, has a problem in that it has insufficient rigidity compared to the side external panel made of a steel material, and a portion of the side external panel on which stress is concentrated, such as a door hinge mount on which a door hinge is mounted, is damaged.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a door hinge mount of a side external panel for a vehicle, configured for being formed of a material requiring lower initial investment expenses than a steel material, and securing the same level of rigidity as in the case where the steel material is used.

Therefore, various aspects of the present invention provide a door hinge mount of a side external panel for a vehicle, which includes: a mounting panel portion on which door hinges are mounted; and a variable panel portion which is integrally formed at an edge portion of the mounting panel portion, extends in a circumferential direction of the mounting panel portion, and gradually becomes reduced in thickness in a direction away from the edge portion of the mounting panel portion.

The door hinge mount of the side external panel has the following features.

The variable panel portion my include: an upper variable portion which has a thickness reduced upward; a lower variable portion which is disposed below the upper variable portion and has a thickness reduced downward; a front variable portion which extends from a front end portion of the upper variable portion and a front end portion of the lower variable portion and has a thickness reduced forward thereof; and a rear variable portion which extends from a rear end portion of the upper variable portion and a rear end portion of the lower variable portion and has a thickness reduced backward thereof.

The mounting panel portion may be a flat panel having a uniform thickness as a whole.

An external surface of the variable panel portion may be flat with respect to an external surface of the mounting panel portion, and an internal surface of the variable panel portion may be inclined with respect to an internal surface of the mounting panel portion.

The mounting panel portion may include at least a hinge fastening hole for mounting the door hinges, and at least a position regulating bump for regulating a position of the at least a hinge fastening hole.

At least a position regulating bump may be assembled to at least a position regulating hole formed in a side external reinforcement, and the side external reinforcement may be a panel coupled with the side external panel.

At least a spacer, by which the at least a door hinge mounted on the external surface of the mounting panel portion is spaced from the external surface of the mounting panel portion, may be provided in the at least a hinge fastening hole of the mounting panel portion. The door hinges may be mounted on the mounting panel portion through hinge mounting bolts passing through the hinge fastening holes The at least a spacer may include: a flat spacer external panel portion which is disposed on the external surface of the mounting panel portion; a flat spacer internal panel portion which is disposed on the internal surface of the mounting panel portion; and a cylindrical spacer center panel portion which extends from an internal circumference of the spacer internal panel portion to an internal circumference of the spacer external panel portion, and is disposed through the plurality of hinge fastening holes.

The variable panel portion may include a plurality of beads which is disposed at intervals in a circumferential direction thereof, and the beads may protrude from the internal surface of the variable panel portion.

The door hinge mount may be a portion of the side external panel, and the side external panel including the door hinge mount may be formed of a plastic composite material.

According to the means for solving the problem described above, various aspects of the present invention provide the following main effects.

First, the door hinge mount of the side external panel adopts a variable thickness structure, preventing degradation in rigidity caused by the plastic composite material of the side external panel.

Second, the door hinge mount of the side external panel can secure the same level of rigidity as that formed of a steel material in the related art.

Third, the mounting panel portion of the door hinge mount includes the spacers, which disperse stress concentrated around the hinge fastening holes of the mounting panel portion through the door hinge, hinge mounting bolts, and hinge mounting nuts, preventing damage caused by the stress.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described with reference to the appended drawings. Forms indicated by the appended drawings may be different from forms that are actually implemented by drawings schematized to easily describe embodiments of the present invention.

Throughout the specification, when a certain portion "includes" a certain component, this indicates that other components are not excluded, but may be further included, unless otherwise described.

The directions such as top and bottom, left and right, and front and rear described herein will be based on a vehicle and its body unless otherwise described.

Figure 1:
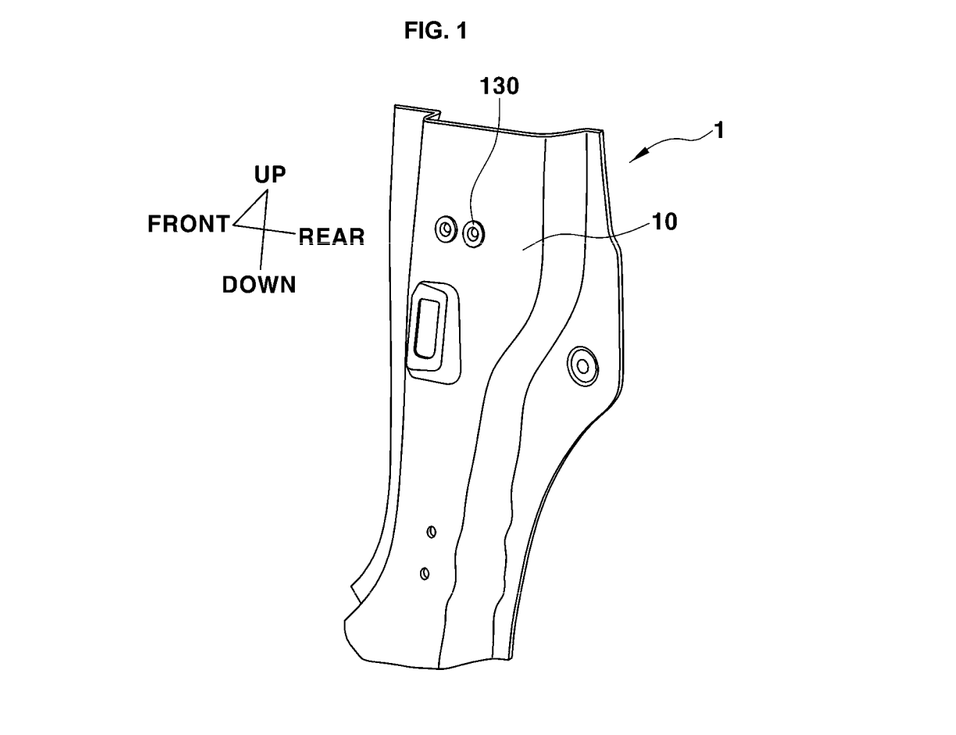
FIG. 1 is a view exemplarily illustrating a side external panel for a vehicle to which a door hinge mount according to various exemplary embodiments of the present invention is applied, when viewed from the outside of a vehicle body.
Figure 2:
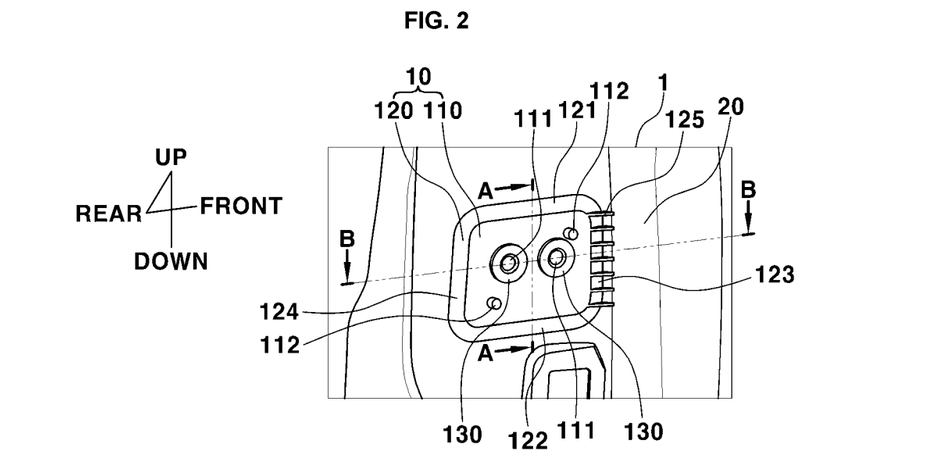
FIG. 2 is a view exemplarily illustrating the door hinge mount of the side external panel according to various exemplary embodiments of the present invention, when viewed from the interior of the vehicle body.
Figure 3:
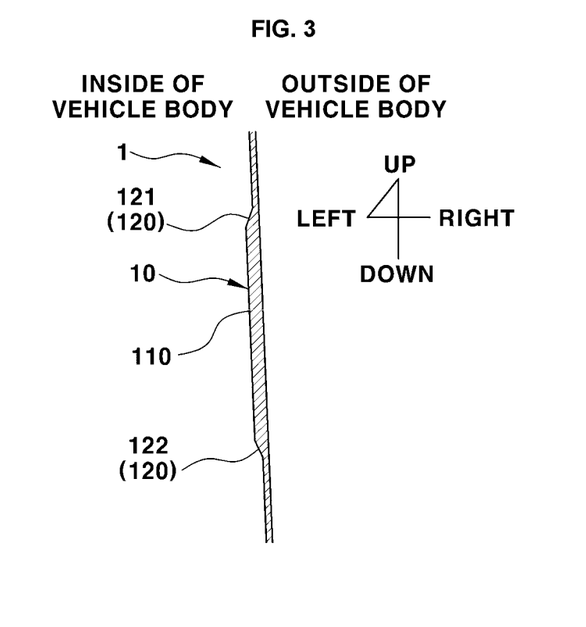
FIG. 3 is a sectional view taken along line A-A of FIG. 2.
Figure 4:
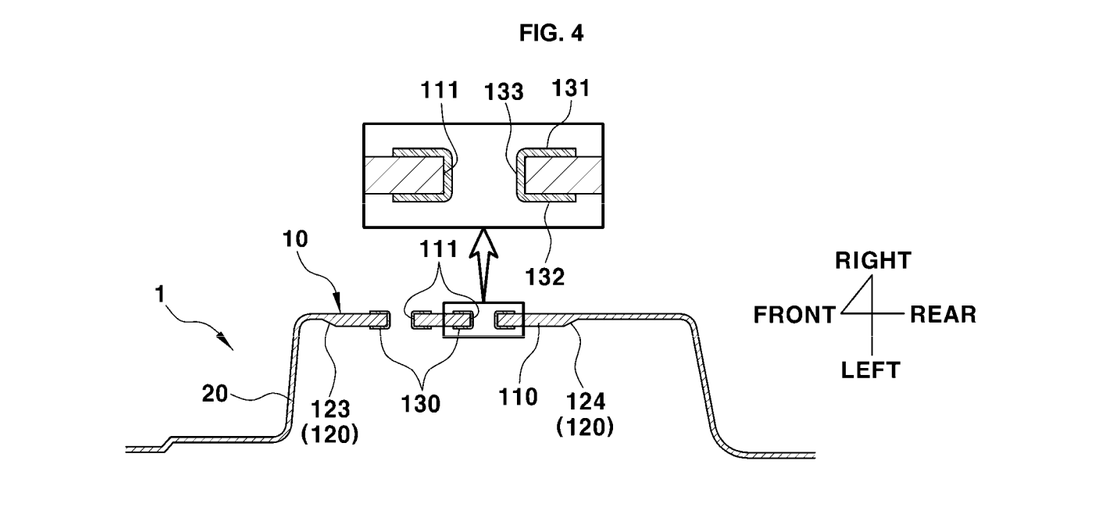
FIG. 4 is a sectional view taken along line B-B of FIG. 2.

FIG. 1 is a view exemplarily illustrating a side external panel for a vehicle to which a door hinge mount according to various exemplary embodiments of the present invention is applied, when viewed from the outside of a vehicle body. FIG. 2 is a view exemplarily illustrating the door hinge mount of the side external panel according to various exemplary embodiments of the present invention, when viewed from the interior of the vehicle body. FIG. 3 is a sectional view taken along line A-A of FIG. 2, and FIG. 4 is a sectional view taken along line B-B of FIG. 2.

Figure 5:
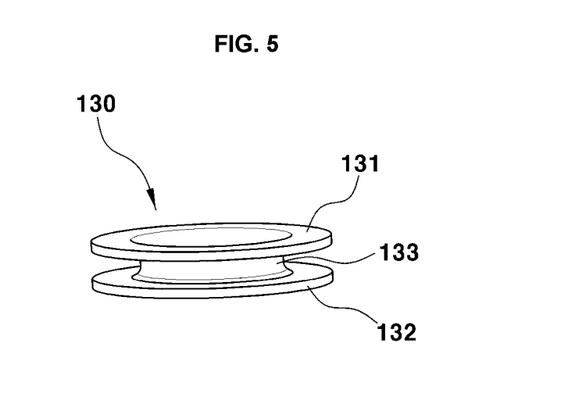
FIG. 5 is a view exemplarily illustrating a spacer according to various exemplary embodiments of the present invention.
Figure 6:
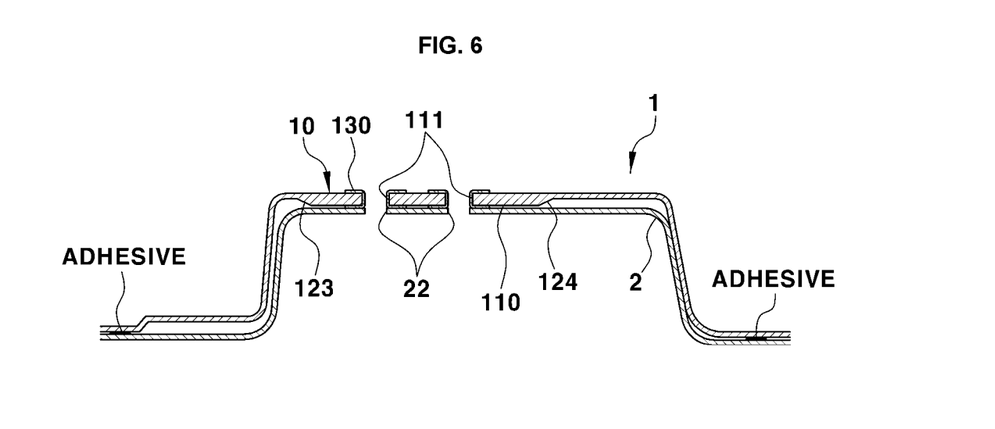
FIG. 6 is a view exemplarily illustrating a side external reinforcement coupled to the side external panel according to various exemplary embodiments of the present invention.
Figure 7:
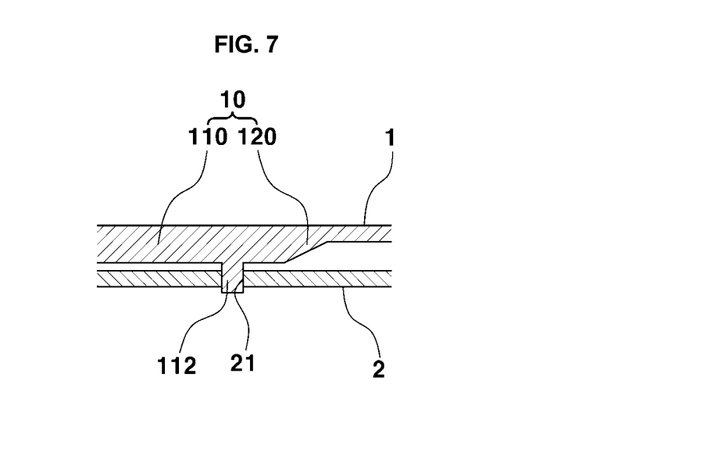
FIG. 7 is a view exemplarily illustrating a state in which a position regulating bump according to various exemplary embodiments of the present invention is assembled in a position regulating hole of the side external reinforcement.
Figure 8:
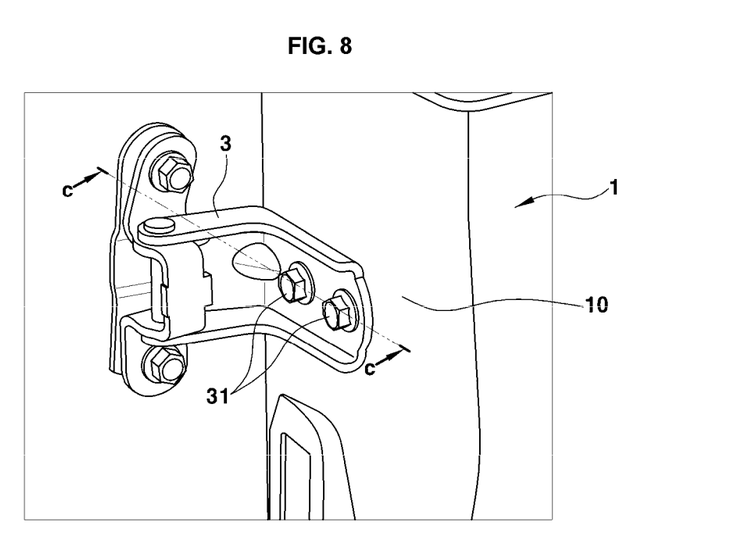
FIG. 8 is a view exemplarily illustrating a state in which a door hinge is mounted on the door hinge mount according to various exemplary embodiments of the present invention.
Figure 9:
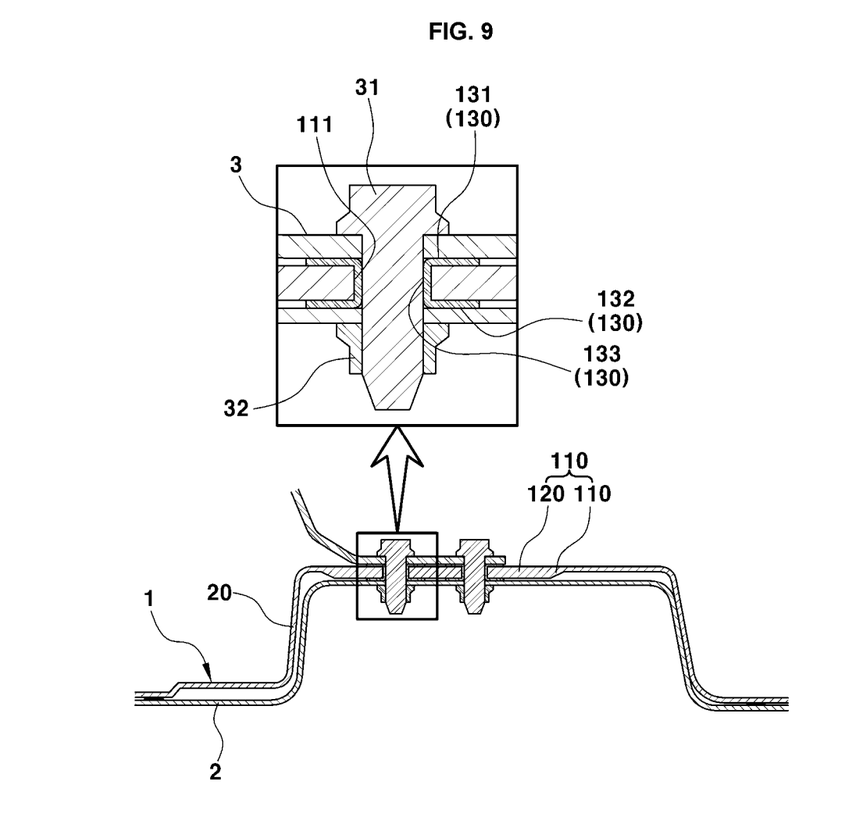
FIG. 9 is a sectional view taken along line C-C of FIG. 8.

Furthermore, FIG. 5 is a view exemplarily illustrating a spacer according to various exemplary embodiments of the present invention. FIG. 6 is a view exemplarily illustrating a side external reinforcement coupled to the side external panel according to various exemplary embodiments of the present invention. FIG. 7 is a view exemplarily illustrating a state in which a position regulating bump according to various exemplary embodiments of the present invention is assembled in a position regulating hole of the side external reinforcement. FIG. 8 is a view exemplarily illustrating a state in which a door hinge is mounted on the door hinge mount according to various exemplary embodiments of the present invention. FIG. 9 is a sectional view taken along line C-C of FIG. 8.

As illustrated in FIG. 1, a side external panel 1 for a vehicle has a door hinge mount 10 in which hinge fastening holes 111 for mounting door hinges (see a reference number 3 of FIG. 8 and FIG. 9) are formed.

The door hinges 3 are configured to support pivot movement for opening/closing a side door for a vehicle. In the side external panel 1, the door hinges 3 are mounted in two or more places to support one side door.

The side external panel 1 may have the door hinge mount 10 at a position at which each door hinge 3 is mounted.

The door hinge mount 10 is a portion of the side external panel 1, and is a portion on which the door hinge 3 is mounted in the side external panel 1.

As illustrated in FIG. 2, FIG. 3 and FIG. 4, the door hinge mount 10 is provided in a form of a panel having a region-specific variable thickness to increase its rigidity.

The door hinge mount 10 includes a mounting panel portion 110 on which the door hinge 3 is mounted and disposed, and a variable panel portion 120 which is integrally provided at an edge portion of the mounting panel portion 110.

The mounting panel portion 110 includes the plurality of hinge fastening holes 111 for mounting the door hinge 3, and may be formed as a flat panel having a uniform thickness as a whole. For example, the mounting panel portion 110 may be formed as a flat panel having an approximately quadrilateral shape.

This mounting panel portion 110 may be provided to have a thicker thickness than other regions of the side external panel 1 excluding the door hinge mount 10. To be more specific, the side external panel 1 may be configured such that the mounting panel portion 110 which is a region surrounded with the variable panel portion 120 is provided to be thicker than an external region of the variable panel portion 120 which surrounds the variable panel portion 120.

The variable panel portion 120 is provided at an edge portion of the mounting panel portion 110 to extend in a circumferential direction of the mounting panel portion 110. The variable panel portion 120 seamlessly extends in the circumferential direction of the mounting panel portion 110 such that stress is uniformly applied, and is disposed at the edge portion of the mounting panel portion 110 in a loop form.

The variable panel portion 120 has a thickness reduced in a direction away from the edge portion of the mounting panel portion 110. That is, the variable panel portion 120 has the thickness gradually reduced toward the outside of the mounting panel portion 110. In the instant case, the thickness of the variable panel portion 120 is a thickness in a left and right direction of the vehicle body.

The thickness of the present variable panel portion 120 may be reduced in a given proportion according to a distance away from the edge portion of the mounting panel portion 110. Accordingly, the variable panel portion 120 may include a surface having a given gradient with respect to the mounting panel portion 110.

To be specific, the variable panel portion 120 may include an upper variable portion 121, a lower variable portion 122, a front variable portion 123, and a rear variable portion 124.

The upper variable portion 121 is a portion that extends from an upper edge portion of the mounting panel portion 110, and has a thickness in a left and right direction which is reduced upwards from the upper edge portion of the mounting panel portion 110. The thickness of the upper variable portion 121 may be reduced in a provided proportion according to a distance away from the upper edge portion of the mounting panel portion 110.

The lower variable portion 122 is a portion that extends from a lower edge portion of the mounting panel portion 110, and has a thickness in a left and right direction which is reduced downwardly from the lower edge portion of the mounting panel portion 110. The thickness of the lower variable portion 122 may be reduced in a given proportion according to a distance away from the lower edge portion of the mounting panel portion 110. The lower variable portion 122 is disposed below the upper variable portion 121, and the mounting panel portion 110 is disposed between the upper variable portion 121 and the lower variable portion 122.

The front variable portion 123 is a portion that extends from a front edge portion of the mounting panel portion 110, and has a thickness in a left and right direction which is reduced forward from the front edge portion of the mounting panel portion 110. The thickness of the front variable portion 123 may be reduced in a given proportion according to a distance away from the front edge portion of the mounting panel portion 110. The front variable portion 123 may be integrally connected to a front end portion of the upper variable portion 121 and a front end portion of the lower variable portion 122, and extend from the front end portion of the upper variable portion 121 to the front end portion of the lower variable portion 122.

The rear variable portion 124 is a portion that extends from a rear edge portion of the mounting panel portion 110, and has a thickness in a left-right direction which is reduced backward from the rear edge portion of the mounting panel portion 110. The thickness of the rear variable portion 124 may be reduced in a given proportion according to a distance away from the rear edge portion of the mounting panel portion 110. The rear variable portion 124 may be integrally connected to a rear end portion of the upper variable portion 121 and a rear end portion of the lower variable portion 122, and extend from the rear end portion of the upper variable portion 121 and the rear end portion of the lower variable portion 122. The rear variable portion 124 is disposed at the rear of the front variable portion 123, and the mounting panel portion 110 is disposed between the rear variable portion 124 and the front variable portion 123.

The upper variable portion 121 and the lower variable portion 122, and the front variable portion 123 and the rear variable portion 124 may have the same thickness such that stress is uniformly applied by the door hinge 3 supporting the side door for a vehicle, and the thicknesses thereof may be reduced in the same proportion. The side door is coupled to the mounting panel portion 110 through the door hinge 3.

To secure the aesthetic appearance of the side external panel 1, the variable panel portion 120 configured as above may have an external surface thereof which flatly extends from an external surface of the mounting panel portion 110 without a slope, and an internal surface thereof which extends from an internal surface of the mounting panel portion 110 at a given slope. That is, an external surface of the variable panel portion 120 may be flat with respect to the external surface of the mounting panel portion 110, and an internal surface of the variable panel portion 120 may be inclined with respect to the internal surface of the mounting panel portion 110.

Here, the external surface of the variable panel portion 120 is a surface of the variable panel portion 120 which faces the outside of the vehicle body, and the internal surface of the variable panel portion 120 is a surface of the variable panel portion 120 which faces the interior of the vehicle body. Likewise, the external surface of the mounting panel portion 110 is a surface of the mounting panel portion 110 which faces the outside of the vehicle body, and the internal surface of the mounting panel portion 110 is a surface of the mounting panel portion 110 which faces the interior of the vehicle body.

Furthermore, to further increase rigidity of the door hinge mount 10, the variable panel portion 120 may include a plurality of beads 125 the variable.

The beads 125 may protrude from the internal surface of the variable panel portion 120, and be disposed at intervals in a circumferential direction of the variable panel portion 120. The beads 125 may protrude from the inclined internal surface of the variable panel portion 120, and extend up to the same height as the internal surface of the mounting panel portion 110.

The beads 125 may be selectively provided on one side of the variable panel portion 120. For example, as illustrated in FIG. 2, the beads 125 may be integrally provided on the front variable portion 123, and be disposed in top-to-bottom direction thereof. In the case where the beads 125 protrude from the front variable portion 123, the beads 125 may extend from the edge portion of the mounting panel portion 110 to a bent surface 20 of the side external panel 1.

The bent surface 20 is a portion of the side external panel 1, and is a portion disposed in the front of the door hinge mount 10. The bent surface 20 is a panel portion which is disposed to be perpendicular to the mounting panel portion 110. The bent surface 20 may be disposed close or adjacent to a front edge portion of the front variable portion 123.

Therefore, the case where the beads 125 are disposed at the front variable portion 123 of the variable panel portion 120 and extend up to the bent surface 20 to be connected to the bent surface 20 may more effectively increase the rigidity of the door hinge mount 10 than the other cases.

The increased rigidity of the door hinge mount 10 has an advantage favorable to sagging improvement of the side door fastened to the mounting panel portion 110 and prevention of post deformation in the door hinge mount 10.

Meanwhile, the hinge fastening holes 111 of the mounting panel portion 110 may be arranged in various directions according to a shape of the door hinge 3 mounted on the mounting panel portion 110. For example, the hinge fastening holes 111 may be arranged in the mounting panel portion 110 front and rear or up and down.

It is necessary to regulate positions of the hinge fastening holes 111 against a side external reinforcement 2 coupled with the side external panel 1.

As illustrated in FIG. 6, the side external panel 1 is coupled with the side external reinforcement 2 using an adhesive, and it takes about three to four hours for the adhesive to be completely hardened. The side external panel 1 is typically conveyed to another assembly line before the adhesive is completely hardened during assembly of the vehicle body.

Thus, to restrict positions of the hinge fastening holes 111 for the side external reinforcement 2 when the side external panel 1 is moved during the assembly of the vehicle body, the hinge fastening holes 111 need to be fixed so as not to deviate from their designated positions during a time when the adhesive is hardened. This is because the side external reinforcement 2 also has reinforcement hinge fastening holes 22 for mounting the door hinge 3.

To fix the positions of the hinge fastening holes 111 for the side external reinforcement 2, or to fix the positions of the hinge fastening holes 111 for the reinforcement hinge fastening holes 22 of the side external reinforcement 2, the mounting panel portion 110 may include a plurality of position regulating bumps 112.

The position regulating bumps 112 may vertically protrude from the internal surface of the mounting panel portion 110. In the case where the mounting panel portion 110 has only one position regulating bump 112, the side external panel 1 may be rolled with respect to the side external reinforcement 2. Therefore, the mounting panel portion 110 may include at least two or more position regulating bumps 112 formed thereon.

As illustrated in FIG. 7, when the side external panel 1 and the side external reinforcement 2 are coupled, the position regulating bumps 112 are assembled through a plurality of position regulating holes 21 formed in the side external reinforcement 2. When coupled with the side external panel 1, the side external reinforcement 2 is disposed on the side of an internal surface of the side external panel 1.

The side external reinforcement 2 is a panel member for reinforcing the side external panel 1 formed of a plastic composite material, and is formed of, for instance, a steel material.

Furthermore, as illustrated in FIG. 4, the mounting panel portion 110 has spacers 130 which are provided in the hinge fastening holes 111 are formed of a steel material and prevent damage to the mounting panel portion 110.

When the side external panel 1 is molded, the spacers 130 are provided to the mounting panel portion 110 in a form in which the spacers 130 are assembled to the hinge fastening holes 111. To be greater specific, the spacers 130 are put into a die for injection-molding the side external panel 1, and the side external panel 1 is molded with the spacers 130 inserted into the die. Accordingly, the spacers 130 may be provided integrally with the hinge fastening holes 111 of the mounting panel portion 110.

As illustrated in FIG. 4 and FIG. 5, each of the spacers 130 may include a spacer external panel portion 131, a spacer internal panel portion 132, and a spacer center panel portion 133.

The spacer external panel portion 131 may be formed in a flat panel shape, and be disposed on the external surface of the mounting panel portion 110 in a layered form. The spacer external panel portion 131 may be formed as an annular flat panel whose center portion is open. The center portion of the spacer external panel portion 131 may be opened in a shape of the hinge fastening hole 111.

The spacer internal panel portion 132 may be formed in a flat panel shape, and be disposed on the internal surface of the mounting panel portion 110 in a layered form. The spacer internal panel portion 132 may be formed as an annular flat panel whose center portion is open. The center portion of the spacer internal panel portion 132 may be opened in a shape of the hinge fastening hole 111. The spacer internal panel portion 132 may have the same shape as the spacer external panel portion 131, and the spacer internal panel portion 132 and the spacer external panel portion 131 may be symmetric with respect to the spacer center panel portion 133.

The spacer center panel portion 133 may be formed in the shape of a cylinder that integrally extends from an internal circumference of the spacer internal panel portion 132 to an internal circumference of the spacer external panel portion 131, and be disposed in the hinge fastening hole 111 in a state in which the spacer center panel portion 133 passes through the hinge fastening hole 111.

When the side external panel 1 is molded, the spacers 130 configured in the instant way may be joined and fixed to the mounting panel portion 110. The spacer external panel portion 131 may be joined and fixed to the external surface of the mounting panel portion 110 in a state in which the internal circumference thereof is adjacent to the hinge fastening hole 111. The spacer internal panel portion 132 may be joined and fixed to the internal surface of the mounting panel portion 110 in a state in which the internal circumference thereof is adjacent to the hinge fastening hole 111. The spacer center panel portion 133 may be joined and fixed to an internal circumference of the mounting panel portion 110 surrounding the hinge fastening hole 111.

In the present way, the spacers 130 are joined to the mounting panel portion 110 in a state in which the spacers 130 are assembled to the hinge fastening holes 111, which makes it possible to prevent damage to the mounting panel portion 110 and secure sealing performance of the mounting panel portion 110.

In the case where the spacers 130 are not applied to the mounting panel portion 110, the mounting panel portion 110 may be vulnerable to damage because stress input through the door hinge 3 formed of a steel material is concentrated around the hinge fastening holes 111.

As illustrated in FIG. 9, the spacer 130 supports the door hinge 3 while disposing the door hinge 3 on the external surface of the mounting panel portion 110 with the door hinge 3 separated by a thickness of the spacer external panel portion 131, and structurally reinforces a surrounding region of the hinge fastening hole 111 of the mounting panel portion 110.

The spacers 130 prevent the door hinges 3 and hinge mounting bolts 31 from coming into direct contact with the mounting panel portion 110, preventing stress input through the door hinges 3 from being concentrated around the hinge fastening holes 111, and dispersing stress input through the hinge mounting bolts 31.

As illustrated in FIG. 8 and FIG. 9, the hinge mounting bolts 31 fasten the door hinges 3 to the mounting panel portion 110 along with hinge mounting nuts 32. The hinge mounting bolts 31 are fastened by the hinge mounting nuts 32 disposed on the side of the internal surface of the mounting panel portion 110 in a state in which the hinge mounting bolts 31 pass through the hinge fastening holes 111.

Furthermore, the door hinge mount 10 secures the sealing performance of the mounting panel portion 110 via the spacers 130. Accordingly, anticorrosive expenses for a side internal panel of the vehicle body may be reduced, and noise intrusion may be reduced. Although not illustrated in the drawings, the side internal panel is coupled with the side external panel 1, and is disposed on a more internal side of the vehicle body than the side external panel 1 and the side external reinforcement 2.

As described above, the door hinge mount 10 adopts a variable thickness structure, preventing degradation in rigidity caused by the plastic composite material thereof. The door hinge mount 10 has the spacers 130 which disperse the stress concentrated around the hinge fastening holes 111 through the door hinge 3, the hinge mounting bolts 31, and the hinge mounting nuts 32, preventing damage caused by the stress.

The side external panel 1 having the door hinge mount 10 is molded using a plastic composite material which requires lower initial investment expenses than the existing steel material, reducing expenses and securing the same level of rigidity as a door hinge mount of the side external panel, formed of a steel material. Furthermore, the rigidity of the door hinge mount 10 is increased compared to the door hinge mount having a uniform thickness as a whole without distinction of the mounting panel portion and the variable panel portion.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door hinge mount of a side external panel for a vehicle, the door hinge mount comprising:
    a mounting panel portion of the side external panel, for at least a door hinge to be mounted on the mounting panel portion; and
    a variable panel portion of the side external panel, wherein the variable panel portion is integrally formed at an edge portion of the mounting panel portion, and extends in a circumferential direction of the mounting panel portion,
    wherein a thickness of the variable panel portion is reduced in a direction away from the edge portion of the mounting panel portion.

2. The door hinge mount of claim 1, wherein the variable panel portion includes:
    an upper variable portion which has a thickness reduced upward;
    a lower variable portion which is disposed below the upper variable portion and has a thickness reduced downward;
    a front variable portion which extends from a front end portion of the upper variable portion and a front end portion of the lower variable portion and has a thickness reduced forward thereof; and
    a rear variable portion which extends from a rear end portion of the upper variable portion and a rear end portion of the lower variable portion and has a thickness reduced backward thereof.

3. The door hinge mount of claim 1, wherein the mounting panel portion is a flat panel having a uniform thickness as a whole.

4. The door hinge mount of claim 1, wherein an external surface of the variable panel portion is flat with respect to an external surface of the mounting panel portion, and an internal surface of the variable panel portion is inclined with respect to an internal surface of the mounting panel portion.

5. The door hinge mount of claim 1, wherein the mounting panel portion includes at least a hinge fastening hole for mounting the at least a door hinge therethrough.

6. The door hinge mount of claim 5, wherein the mounting panel portion further includes at least a position regulating bump for regulating a position of the at least a hinge fastening hole.

7. The door hinge mount of claim 6,
    wherein the at least a position regulating bump is mounted to at least a position regulating hole formed in a side external reinforcement, and
    wherein the side external reinforcement is a panel coupled with the side external panel.

8. The door hinge mount of claim 5,
    wherein at least a spacer, by which the at least a door hinge mounted on an external surface of the mounting panel portion is spaced from the external surface of the mounting panel portion, is provided in the at least a hinge fastening hole of the mounting panel portion.

9. The door hinge mount of claim 8, wherein the at least a door hinge is mounted on the mounting panel portion by at least a hinge mounting bolt passing through the at least a spacer mounted in the at least a hinge fastening hole.

10. The door hinge mount of claim 9,
    wherein the at least a door hinge passes through at least a reinforcement hinge fastening hole of a side external reinforcement, and
    wherein the side external reinforcement is a panel coupled with the side external panel.

11. The door hinge mount of claim 8, wherein the at least a spacer includes:
    a flat spacer external panel portion which is disposed on the external surface of the mounting panel portion;
    a flat spacer internal panel portion which is disposed on an internal surface of the mounting panel portion; and
    a cylindrical spacer center panel portion which extends from an internal circumference of the flat spacer internal panel portion to an internal circumference of the flat spacer external panel portion, and is disposed through the at least a hinge fastening hole.

12. The door hinge mount of claim 11,
    wherein the flat spacer internal panel portion of the at least a spacer is disposed between the mounting panel portion and a side external reinforcement, and
    wherein the side external reinforcement is a panel coupled with the side external panel.

13. The door hinge mount of claim 1, wherein the variable panel portion includes at least a bead protruding from an internal surface of the variable panel portion.

14. The door hinge mount of claim 1, wherein the variable panel portion includes a plurality of beads which is disposed at intervals in a circumferential direction thereof, and the plurality of beads protrudes from an internal surface of the variable panel portion.

15. The door hinge mount of claim 1, wherein the door hinge mount is a portion of the side external panel, and the side external panel including the door hinge mount is formed of a plastic composite material.

\* \* \* \* \*